United States Patent

Kanevsky et al.

Patent Number: 6,009,392
Date of Patent: Dec. 28, 1999

[54] TRAINING SPEECH RECOGNITION BY MATCHING AUDIO SEGMENT FREQUENCY OF OCCURRENCE WITH FREQUENCY OF WORDS AND LETTER COMBINATIONS IN A CORPUS

[75] Inventors: Dimitri Kanevsky, Ossining; Wlodek Wlodzimierz Zadrozny, Tarrytown, both of N.Y.

[73] Assignee: International Business Machines Corporation, Armonk, N.Y.

[21] Appl. No.: 09/007,478

[22] Filed: Jan. 15, 1998

[51] Int. Cl.⁶ ........................................ G01L 9/00
[52] U.S. Cl. .................. 704/245; 704/240; 704/255
[58] Field of Search ................... 704/243, 255, 704/245, 240, 236, 257, 270; 382/228

[56] References Cited

U.S. PATENT DOCUMENTS

| | | | |
|---|---|---|---|
| 5,122,951 | 6/1992 | Kayima ........................................ | 704/9 |
| 5,625,748 | 4/1997 | McDonough et al. .................. | 704/251 |
| 5,649,060 | 7/1997 | Ellozy et al. ........................... | 704/278 |
| 5,659,662 | 8/1997 | Wilcox et al. .......................... | 704/245 |

Primary Examiner—David R. Hudspeth
Assistant Examiner—Donald L. Storm
Attorney, Agent, or Firm—Sughrue, Mion, Zinn, Macpeak & Seas, PLLC

[57] ABSTRACT

A method is provided which trains acoustic models in an automatic speech recognizer ("ASR") without explicitly matching decoded scripts with correct scripts from which acoustic training data is generated. In the method, audio data is input and segmented to produce audio segments. The audio segments are clustered into groups of clustered audio segments such that the clustered audio segments in each of the groups have similar characteristics. Also, the groups respectively form audio similarity classes. Then, audio segment probability distributions for the clustered audio segments in the audio similarity classes are calculated, and audio segment frequencies for the clustered audio segments are determined based on the audio segment probability distributions. The audio segment frequencies are matched to known audio segment frequencies for at least one of letters, combination of letters, and words to determine frequency matches, and a textual corpus of words is formed based on the frequency matches. Then, acoustic models of the automatic speech recognizer are trained based on the textual corpus. In addition, the method may receive and cluster video or biometric data, and match such data to the audio data to more accurately cluster the audio segments into the groups of audio segments. Also, an apparatus for performing the method is provided.

47 Claims, 8 Drawing Sheets

TRAINING SPEECH RECOGNITION BY MATCHING AUDIO SEGMENT FREQUENCY OF OCCURRENCE WITH FREQUENCY OF WORDS AND LETTER COMBINATIONS IN A CORPUS

FIELD OF THE INVENTION

The invention relates to a method of training acoustic models in an automatic speech recognizer ("ASR") and to an ASR which employs the method. More particularly, the method and ASR train acoustic models without explicitly matching decoded scripts with correct scripts that are generated from acoustic training data.

BACKGROUND OF INVENTION

In conventional methods for training acoustic models in an automatic speech recognizer ("ASR"), the ASR must be trained before it can recognize random acoustic data (i.e. spoken words and phrases). In order to train the ASR, a correct script must be manually created by a user and input to the ASR. The user must generate acoustic data by physically and sequentially saying hundreds of sentences. After uttering each sentence, the user must input transcribed data corresponding to the sentence by typing the words of the spoken sentence. As a result of the operation above, the ASR learns what voice patterns of the user correspond to the sounds and phonemes of the words relating to the transcribed data. In other words, the ASR learns the sounds of particular words by aligning the acoustic data (i.e. the correct script) with the transcribed data.

After the ASR has been trained, it is capable of decoding randomly spoken words into a decoded script based on the voice patterns it learned while it was trained. Since the ASR can only understand random acoustic data based on the learned voice patterns, the accuracy of the ASR is proportional to the amount of acoustic data and corresponding transcribed data that it received when it was trained. Naturally, a very large amount of acoustic data and transcribed data are needed to train speaker-independent and continuous ASRs or telephone ASks. However, manually generating the acoustic data and inputting the corresponding transcribed data is time consuming and expensive, and thus, training an ASR so that it can accurately produce decoding scripts from randomly spoken acoustic data is likewise expensive and inefficient.

Alternative training methods, such as unsupervised training methods, do not rely explicitly on transcribed data. Instead, the unsupervised training methods update acoustic model parameters via optimization criteria functions that are computed over non-transcribed acoustic data. These methods are less efficient than the supervised training methods that try to explicitly relate spoken words to the previously stored transcribed words.

In light of the above disadvantages of conventional ASRs, a need exists for a training method which eliminates the requirement of generating acoustic data and manually inputting corresponding transcribed data to the ASR. Specifically, what is needed is a method which automatically transcribes a large amount of acoustic data by repeatedly comparing and refining the acoustic data via an iterative procedure.

SUMMARY OF THE INVENTION

In order to overcome the above problems, a method for training an automatic speech recognizer is provided. The method comprises the steps of: (a) inputting audio data; (b) segmenting the audio data to produce audio segments of the audio data; (c) clustering the audio segments into groups of clustered audio segments, wherein the clustered audio segments in each of the groups have similar characteristics and wherein the groups respectively form audio similarity classes; (d) calculating audio segment probability distributions for the clustered audio segments in the audio similarity classes; (e) determining audio segment frequencies for the clustered audio segments in the audio similarity classes based on the audio segment probability distributions; (f) matching the audio segment frequencies to known audio segment frequencies for at least one of letters, combination of letters, and words to determine frequency matches; (g) forming a textual corpus of words based on the frequency matches; and (h) training acoustic models of the automatic speech recognizer based on the textual corpus.

Also, an apparatus for training an automatic speech recognizer is provided. The apparatus comprises: a receiver which inputs audio data; a segmenting device which is coupled to the receiver and which segments the audio data to produce audio segments of the audio data; an audio clustering device which is coupled to the segmenting device and which clusters the audio segments into groups of clustered audio segments, wherein the clustered audio segments in each of the groups have similar characteristics and wherein the groups respectively form audio similarity classes; a probability calculating device which is coupled to the audio clustering device and which calculates audio segment probability distributions for the clustered audio segments in the audio similarity classes; a frequency determining device which is coupled to the probability calculating device and which determines audio segment frequencies for the clustered audio segments in the audio similarity classes based on the audio segment probability distributions; a frequency comparator which is coupled to the frequency determining device and which matches the audio segment frequencies to known audio segment frequencies for at least one of letters, combination of letters, and words to determine frequency matches; a textual corpus generator which is coupled to the frequency comparator and which generates a textual corpus of words based on the frequency matches; and an acoustic model trainer which is coupled to the textual corpus generator and which trains acoustic models of the automatic speech recognizer based on the textual corpus.

BRIED DESCRIPTION OF DRAWINGS

The above objects and advantages of the present invention will become more apparent by describing in detail preferred embodiments thereof with reference to the attached drawings in which.

DETAILED DESCRIPTION OF PREFERRED EMBODIMENTS

The following description of the preferred embodiments discloses specific configurations, data values, and components. However, the preferred embodiments are merely examples of the present invention, and thus, the specific components and values described below are only used to illustrate more clearly such embodiments and to provide an overall understanding of the present invention. Accordingly, one skilled in the art will readily recognize that the present invention is not limited to such specific components, values, and features. Furthermore, the descriptions of various features and structures of the present invention which would have been known to one skilled in the art are omitted for the sake of clarity and brevity.

Figure 1:
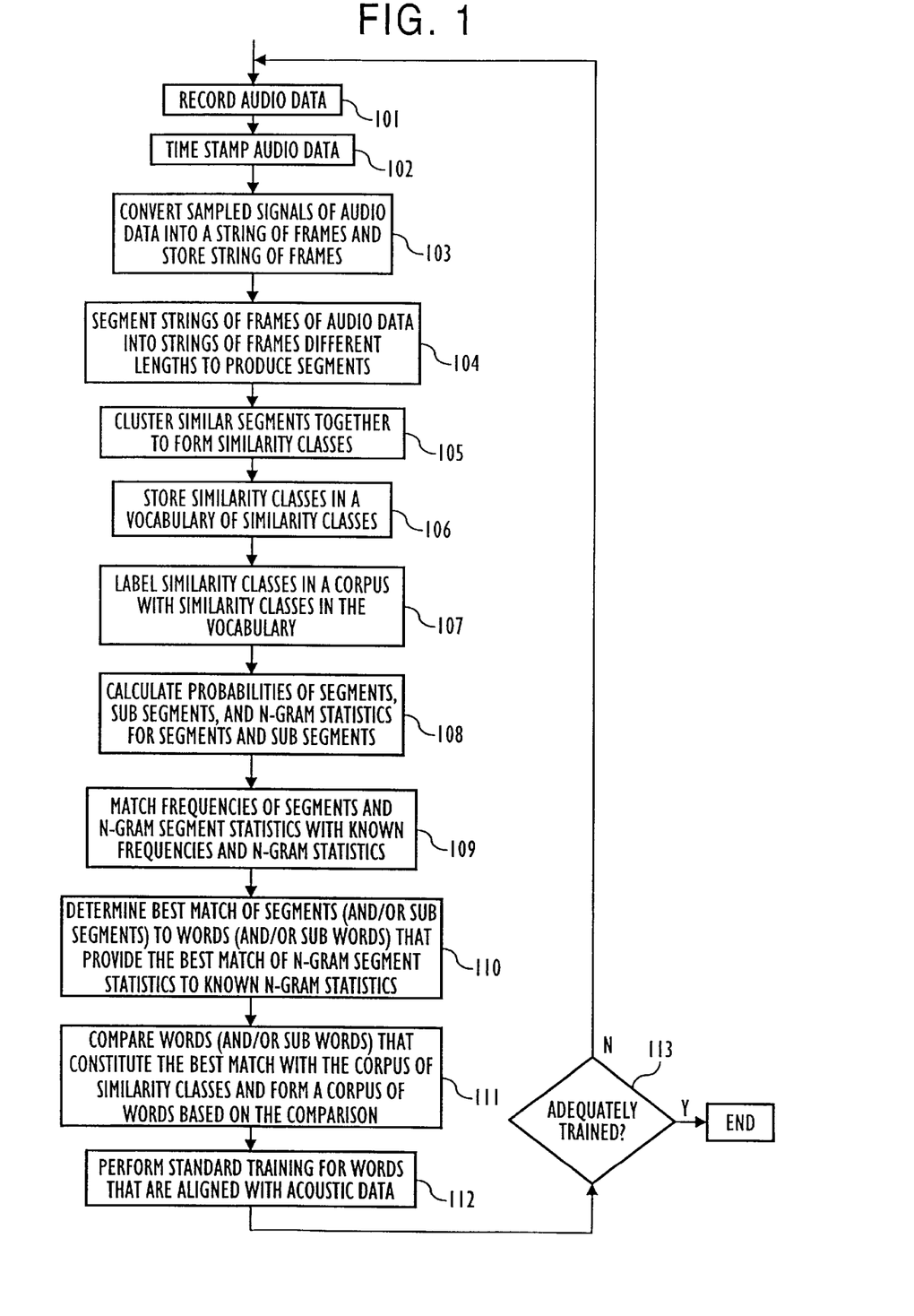
FIG. 1 illustrates a flow chart for the operation of a new training system.

FIG. 1 shows a flow chart of an illustrative embodiment of a method for training an automatic speech recognizer ("ASR"). One of ordinary skill in the art will readily realize however that many of the steps in FIG. 1 can be performed simultaneously or can performed in an order which is different than the order illustrated.

As shown in the figure, audio data (e.g. a spoken word or phrase) is input and recorded (or stored) (step 101), and as the data is recorded, it is time stamped to identify when it was recorded (step 102). The ASR converts sampled signals of the recorded audio data into a string of spectral feature vectors (frames) via a Pulse Code Modulation ("PCM") operation and a Fourier Transform operation and stores the string of frames (step 103). A discussion relating to PCM operations and Fourier Transform operations can be found in the following references: John Bellamy, *Digital Telephony*, John Wiley & Sons (New York 1990) and Saeed V. Vaseghi, *Advanced signal Processing and Digital Noise Reduction*, John Wiley & Sons (New York, 1996). Such references are incorporated herein by reference.

The string of frames of audio data are segmented into strings of frames of different lengths to produce segments (step 104). The segmentation process is explained in more detailed below in conjunction with FIGS. 2a to 2c. Several levels of segments exists which relate to the length of the segments. One set of levels corresponds to different words having different lengths (i.e. short words to long words). Another set of levels of segments corresponds to discrete sounds (i.e. pronunciation of letters or combination of letters).

Afterwards, the segments are compared with each other, and similar segments are clustered together to form audio similarity classes (step 105). An example of how the segments are clustered together to form the similarity classes is explained in more detail below in conjunction with FIG. 3a. Then, each of the different similarity classes are stored in a vocabulary of audio similarity classes (step 106). For example, if three groups of segments are clustered together in step 105 to produce three new and different audio similarity classes C1, C2, and C3, the three classes C1, C2, and C3 would be stored in the vocabulary in step 106. Subsequently, if two additional groups of segments are clustered in step 105 to produce a similarity class C2 and a new similarity class C4, only the similarity class C4 would be stored in the vocabulary as a new similarity class in step 106 since the class C2 has previously been identified and stored. Thus, the vocabulary would contain the similarity classes C1, C2, C3, and C4.

As the segments of acoustic strings are sequentially input and clustered into similarity classes, the similarity classes are sequentially stored in a corpus as the similarity classes D1, D2, D3, D4, D5, etc. Each of the classes D1, D2, D3, D4, D5, etc. in the corpus are identified as and labeled with one of the similarity classes C1, C2, C3, C4, etc. stored in the vocabulary (step 107). For instance, if the segments of audio data that fall within the similarity classes C1, C2, C3, C2, and C4 are sequentially input, a vocabulary containing the classes C1, C2, C3, and C4 is formed. However, the similarity classes D1, D2, D3, D4, and D5 stored in the corpus would be respectively labeled with the similarity classes C1, C2, C3, C2, and C4. Thus, as shown above, the segments of the acoustic frames produced in step 104 are identified within the corpus as belonging to a particular similarity class contained in the vocabulary.

In order to further explain the difference between the vocabulary of similar classes and the corpus of similar classes, an example comparing a vocabulary or words and a corpus of words will be described. A vocabulary of words may contain an alphabetized list of many words in which no two words in the list are the same. On the other hand, a corpus of words contains various words from the vocabulary of words, and some of the words in the corpus may be the same as other words contained in the corpus. For instance, a vocabulary may analogously correspond to a list of words, and a corpus may analogously correspond to a book, novel, or newspaper written with words from the list.

After the strings of audio similarity classes are stored in the corpus, the probabilities of the segments and subsegments contained in the similarity classes are calculated, and the probabilities of the n-gram statistics (n=1, 2, 3, . . . ) for the segments and subsegments contained in the similarity classes are calculated (step 108). An n-gram statistic relates to how many times a particular similarity class or a group of similarity classes is stored in the corpus of similarity classes. For example, a 1-gram statistic (or a 1-gram count) $N_{C1}$ for the similarity class C1 is calculated by counting the number of times that the similarity class C1 is stored in the corpus. Also, 1-gram statistics $N_{C2}$, $N_{C3}$, $N_{C4}$, etc. can be respectively calculated for each of the other similarity classes C2, C3, C4, etc. In the example described above, the corpus contains the similarity classes C1, C2, C3, C2, and C4. Therefore, the 1-gram statistics $N_{C1}$, $N_{C2}$, $N_{C3}$, and $N_{C4}$ respectively equal 1, 2, 1, and 1. The probability $P_{Cx}$ of a 1-gram statistic $N_{Cx}$ is calculated as a ratio of the 1-gram statistic $N_{Cx}$ to the total number of similarity classes $N_{TOT}$ contained in the corpus. In other words, $P_{Cx}=N_{Cx}/N_{TOT}$. In the above example, the probability $P_{C1}$ of the 1-gram statistic $N_{C1}$ equals $(N_{C1}/N_{TOT})=(1/5)=0.2$. The probabilities $P_{C2}$, $P_{C3}$, and $P_{C4}$ of the 1-gram statistics $N_{C2}$, $N_{C3}$, and $N_{C4}$ respectively equal 0.4, 0.2, and 0.2.

A 2-gram statistic is similar to a 1-gram statistics except that it determines the number of times that a pair of similarity classes (e.g. C1 and C2) is contained in a corpus. Also, the probability of a 2-gram statistic is calculated in a manner which is similar to the manner in which the probability of a 1-gram statistic is calculated. An example of calculating the n-gram statistics and the probabilities of the n-gram statistics is described in more detail below in conjunction with FIG. 6.

After the probabilities are calculated in step 108, the frequencies of the segments and the n-gram segment statistics are matched with known frequencies and n-gram statistics for letters, combinations of letters, and words (step 109). The known frequencies may be obtained from large textual corpuses by using methods which are similar to those described in Lalit R. Bahl, et al., *A Maximum Likelihood Approach to Continuous Speech Recognition*, IEEE Transactions on Pattern Analysis and Machine Intelligence, vol. PAMI-5, No. 2 (March 1983). Such reference is incorporated herein by reference.

To illustrate an example of how the known frequencies and n-gram statistics are obtained, assume that an ASR is used to interpret acoustic data from a broadcast news program. In such instance, a news vocabulary of known words may be created based on the words contained in printed news media (e.g. newspapers, magazines, the internet, etc.). Since the total number of words contained in the various printed news media (i.e. the various textual corpuses) is very large, the news vocabulary may be created by selecting a certain number (e.g. 65,000) of the most frequently used words in the textual corpus. Thus, even though the acoustic data from the broadcast news program does not identically correspond to the words contained in the news vocabulary, the distribution probabilities and the n-gram statistics of the spoken words in the news program and the words in the news vocabulary are roughly the same because they relate to the same subject matter.

Once the frequencies of the segments and statistics have been matched with known segments and statistics in step 109, the best match of segments (and/or subsegments) to words (and/or subwords) which provides the best match of n-gram segment statistics and n-gram statistics for letters, combinations of letters, and words is determined (step 110). An example of how the best match is determined is described below in conjunction with FIG. 4 which illustrates how segments are matched to words by matching the probability distributions of the segments and words. The word or words that constitute the best match are compared with the corpus of audio similarity classes formed in step 107, and the word or words which match the similarity classes are used to form a corpus of words (step 111). In other words, by finding the best match between the frequencies of the segments and the known frequencies S and between the n-gram statistics for the segments and the n-gram statistics for letters, combinations of letters, and words, a string of similarity classes is mapped into a string of words by mapping each similarity class into a corresponding word. Then, the string of words are stored in a corpus of words.

Afterwards, a standard training of acoustic parameters for the ASR is performed for the words contained in the corpus of words which have been aligned with the time stamped values of the acoustic data that was recorded in step 101 (step 112). One example of the standard training operation mentioned above is described in Chin-hui Lee, Frank K. Soong, Kuldip K. Paliwal, *Automatic speech and Speaker Recognition*, Kluwer Academic Publisher (Boston 1996). The above reference is incorporated herein by reference.

Then, the procedure determines if the ASR has been adequately trained such that the ASR recognizes words with a particular accuracy (step 113). If the ASR has not been adequately trained, the procedure returns to step 101 and the method is repeated. Thus, the training method is refined since it is based on an improved acoustic model that was obtained via the first iteration of the procedure. This refined training is also based on an improved segmentation (step 104) that is better able to take into account the alignment of words to strings of acoustic frames that are produced from the recorded data in step 101. In addition, the refined training is based on an improved similarity clustering (step 105) in which the correspondence of the audio similarity classes to words is more refined.

Figure 1A:
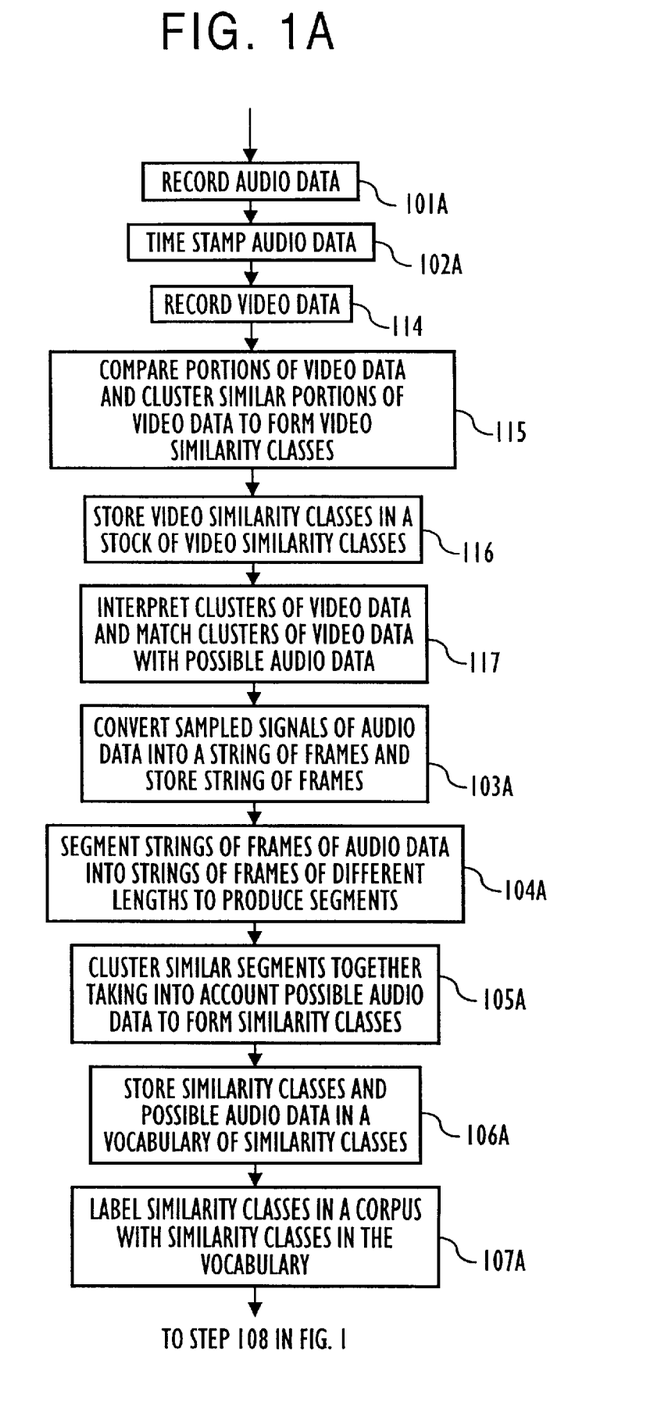
FIG. 1A illustrates a flow chart for an alternative embodiment of a new training system.

Another embodiment of the training method for an ASR is shown in FIG. 1A. In the embodiment, the ASR may additionally record and classify video data and/or biometric data in order to improve the accuracy of its speech recognition function. The steps in the method which are similar to the steps described above and shown in FIG. 1 are designated with the same reference numerals and appended with the letter "A". Also, the steps which are similar to the steps in FIG. 1 will not be described in detail for the sake of brevity. One of ordinary skill in the art will readily realize that many of the steps in FIG. 1A can be preformed simultaneously or can be preformed in an order which is different to the order shown in the figure.

In the embodiment, the audio data is recorded and time-stamped (steps 101A and 102A), and the video and/or biometric data is input and recorded (or stored) (step 114). Then, portions of the video and/or biometric data are compared with each other, and similar portions are clustered together to form video similarity classes (step 115). The process of clustering the video and/or biometric data in step 115 is similar to the process of clustering the segments of audio data in step 105 described above.

Each of the video similarity classes is stored in a stock of video similarity classes (step 116). A stock of similarity classes is somewhat different than a vocabulary or corpus of similarity classes. A vocabulary of similarity classes contains a large number of similarity classes C1, C2, C3, ... Ck, and a corpus of similarity classes is a list of similarity classes C5, C4, C5, C1, C1, C1000, and C1 that corresponds to the data input to the ASR. As shown above, a similarity class (e.g. C1 or C5) may be repeated in the corpus. A stock of similarity classes is a list of similarity classes which corresponds to the data input to the ASR and which does not list any particular similarity class twice. In the above example, a stock of the similarity classes would contain the similarity classes C5, C4, C1, and C1000. Therefore, in step 116, the stock of video similarity classes may be formed by creating a corpus of video similarity classes and deleting any of the repeated similarity classes from the corpus.

After the stock of similarity classes has been formed, the time-aligned clusters of video and/or biometric data are interpreted and matched with possible audio data that may correspond to the video and/or biometric data (step 117). Meanwhile, the audio data which has been recorded in step 101A is converted into a string of frames of audio data (step 103A), and the strings of frames are segmented into segments (step 104A). Then, the possible audio data obtained in step 117 is used to cluster the segments of audio data to improve the accuracy and precision in which the segments of audio data are clustered to form audio similarity classes (step 105A). Each of the different audio similarity classes formed in step 10SA and the possible audio data obtained in step 117 are stored in a vocabulary of audio similarity classes (step 106A). Also, the similarity classes are stored in a corpus (step 107A). The remaining unillustrated steps of the method are similar to the steps 108 to 113 of the method described in conjunction with FIG. 1.

To provide an illustrative and conceptual example of the use of the video data described above, consider the behavior of a person who purchases movie tickets at a ticket booth. The person has a limited set of actions that may be classified as follows: 1) lean towards the ticket booth window, 2) take a wallet out of a pocket, 3) take a payment (e.g. cash, credit card, check book) from the wallet, 4) give the payment to a ticket salesperson, 5) receive something (e.g. tickets and money) from the ticket salesperson, etc. Some of the actions above often correspond to a limited set of typical phrases that are related to the actions. Such typical phrases may correspond to an inquiry or statement by the person who is buying the tickets about 1) the cost and number of tickets, 2) the names of movies, 3) the starting times of the movies, etc. Also, when the person first approaches and leans towards the ticket booth window, he or she typically says "hello". Similarly, shortly before the person turns away from and leaves the ticket booth, the person usually says "good-bye" or "thank you". As mentioned above, such actions can automatically be interpreted during step 117 based on the stock of actions stored in step 116. Also, the actions may be automatically interpreted in step 117 in accordance with the Natural Language Understanding ("NLU") of spoken phrases. An explanation of the NLU is contained in W. Zadrozny et al., *NL Understanding with a Grammar of Constructions*, Proceedings of the International Conference on Computational Linguistics (August 1994) and Dowding et al. *Gemini: A Natural Language System for Spoken-Language Understanding*, Proceedings of the 31st Annual Meeting of the Association for Computational Linguistics, pp.54–61 (June 1993). Such references are incorporated herein by reference. Also, as explained above, the various similarity classes of video data which are generated in step 115 enable the clustering of audio data in step 105 to be improved. For example, the segments of audio data can be grouped together if they relate to the same classes of video data and can be separated into different audio similarity classes if they correspond to different video similarity classes.

Similar technology can be applied to biometric data. For example, biometric data could be collected in various situations involving medical care in which typical spoken words often correspond to certain biometric characteristics. Specifically, a correlation may exist between spoken phrases of bedridden patients and their pulses, heart rhythms, and other biometric characteristics.

Figure 2A:
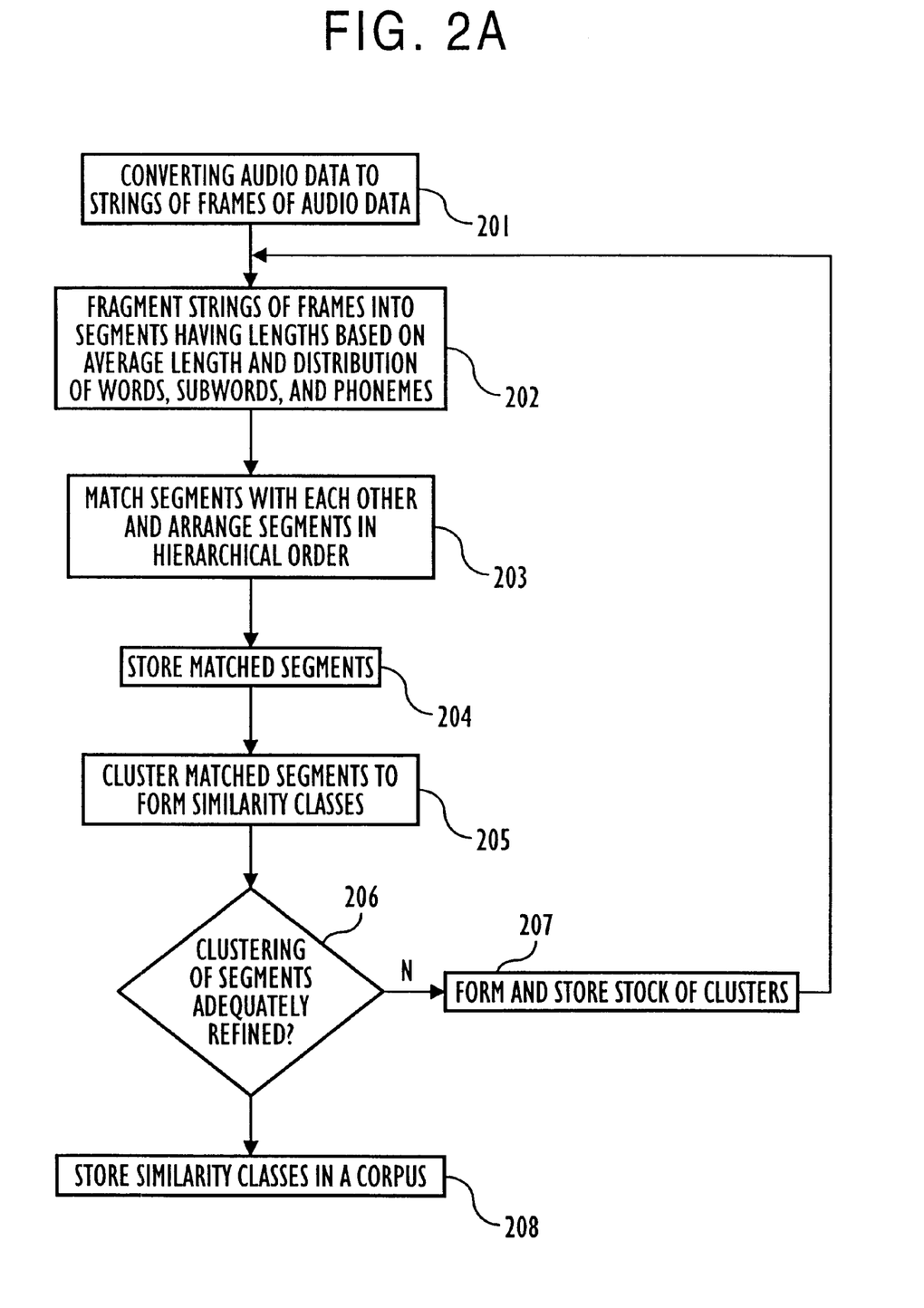
FIG. 2A illustrates a flow chart for the audio segmentation procedure shown in FIG. 1.

FIG. 2a illustrates more detailed procedures that may be used in various steps shown in FIG. 1. In FIG. 2a, step 201 corresponds to step 103, step 202 corresponds to step 104, steps 203–207 correspond to step 105, and step 208 corresponds to step 107. As shown in the figure, audio signals are sampled at a frequency rate and a fast Fourier transform operation is applied to the sampled signals to produce strings of frames of audio data (step 201). The strings of frames are fragmented into all possible segments having lengths that are based on the average lengths of words, subwords, and phonemes and based on the probability distributions of the words, subwords, and phonemes (step 202). The probability distribution of a word is computed as a ratio of the number of times that the word appears in a textual corpus to the total number of words in the corpus. Similarly, the probability distribution of a subword or phoneme can be computed as a ratio of the number of times the word or phoneme appears in a textual corpus to the total number of subwords or phonemes in the corpus. The fragmentation process in step 202 should preferably begin with several of the most frequent lengths of phonemes and words.

Figure 2B:
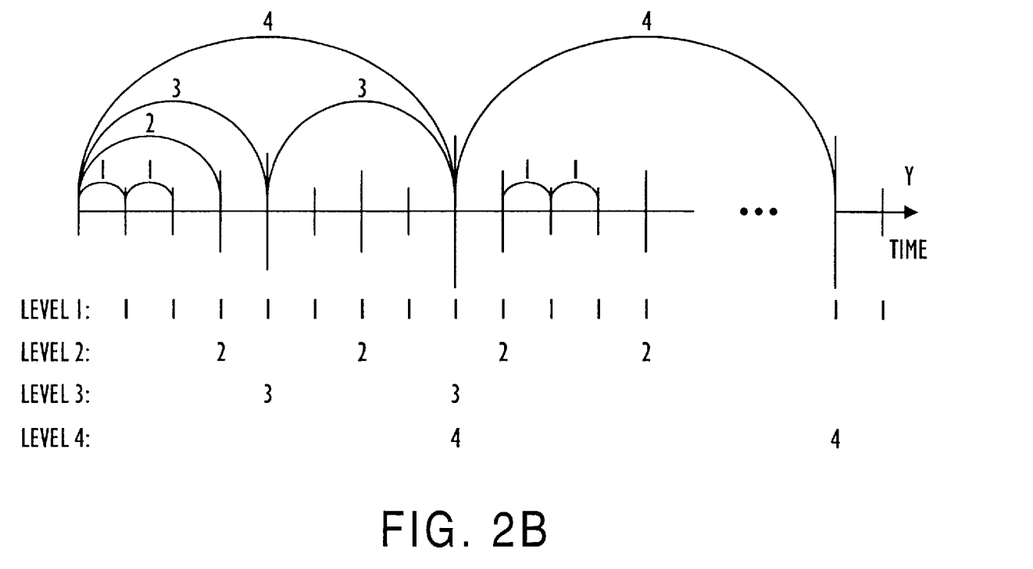
FIG. 2B illustrates an example of the fragmentation of an acoustic string XY.

FIG. 2b provides an example of the fragmentation of an acoustic string XY. The string XY symbolically denotes acoustic information (e.g. 20 dimensional vectors of 20 bands of energy specters) that is stored along a time line XY. In order to fragment the string XY, it may be partitioned in "small" segments having level 1 lengths, "medium" segments having level 2 lengths, and "large" segments having level 3 or 4 lengths. As noted in the figure, the small segments having level 1 lengths are denoted on the time line XY by 1's and by some arcs labeled with 1's. (All of the small segments are not denoted with arcs in the figure for the sake of clarity). The level 1 lengths typically correspond to the length of the most frequently used long phonemes or vowels (e.g. "a" or "o"). The medium segments are marked on the time line XY with 2's and by some arcs labeled with 2's. (All of the medium segments are not denoted with arcs in the figure for the sake of clarity). The level 2 lengths typically correspond to the length of the most frequently used short words (e.g. "say", "may", etc.). The large segments are marked on the time line XY with 3's or 4's and by some arcs labeled with 3's or 4's. (As in the case of the small and medium segments, all of the large segments are not denoted with arcs in the figure for the sake of clarity). The level 3 and 4 lengths typically correspond to the length of the most frequently used average-lengthed or longer words (e.g. "Moscow", "distributed", etc.). The points on the time line XY form division points for the small, medium, and large segments (i.e. for the level 1, 2, 3, and 4 lengths) and may overlap as shown in FIG. 2b.

The segments obtained in step 202 are approximately matched with each other and arranged in a hierarchical order (step 203). For example, the smallest segments having the level 1 lengths are matched among themselves using some similarity criteria. The similarity criteria may be some measure of distance between the segments (e.g. a Euclidean or Kulback distance) that is based on a string of vectors along the time line XY. A detailed explanation about how to measure distances based on a string of vectors can be found in Chin-hui Lee, Frank K. Soong, Kuldip K. Paliwal, *Automatic speech and Speaker Recognition*, Kluwer Academic Publisher (Boston 1996) and in associated references listed in the above reference. Such references are incorporated herein by reference. Also, the similarity criteria may be based on information obtained from the stock of similarity classes stored in step 207 described below.

Figure 2C:
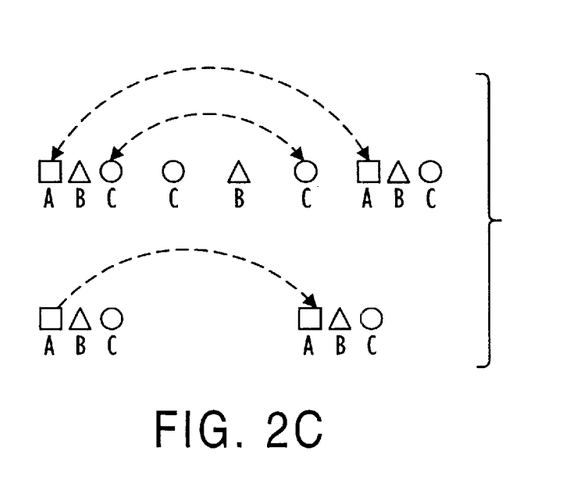
FIG. 2C illustrates similar segments that have been grouped in the same similarity classes.

FIG. 2c shows similar segments which have level 1 lengths and which have been grouped in the same similarity classes denoted by the same letter (e.g. A, B, or C). Also, the similarity of larger segments is established by comparing their respective subsegments that have already been grouped in the same similarity classes. For example, medium segments having level 2 lengths include small subsegments having level 1 lengths that are denoted by the letters A, B, and C. Such medium segments may represent a new similarity class for segments having level 2 lengths. This procedure can be continued in a hierarchical fashion and can be combined with more sophisticated methods for establishing similar patterns of acoustic strings. Also, if a first segment corresponds to higher level than a second segment, the first segment is considered to dominate the second segment.

The procedure for matching segments according to similarity criteria may also be based on a Hidden Markov Model. A large amount of pattern recognition literature that describes various methods on how to relate physical strings of physical quantities as similar strings and map them into vectors in some measurable space exists. One such reference is Mari Ostendorf, *From HMMs to Segment Models: Stochastic Modeling for CSR, in Automatic speech and Speaker Recognition*, Kluwer Academic Publisher (Boston 1996) (edited by Chin-hui Lee, Frank K. Soong, and Kuldip K. Paliwal). Such reference is incorporated herein by reference.

Afterwards, each set of matched segments (i.e. each set of segments denoted by a similarity class label) is stored (step 204) and clustered to form similarity classes (step 205). The manner in which the sets of matched segments are clustered is described in more detail below in conjunction with FIGS. 3a and 3b. Then, the procedure determines if the clustering of matched segments is adequately refined to an acceptable level (step 206).

If the clustering has not been adequately refined, a stock of similarity classes of the matched segments is formed and stored (step 207), the procedure returns to step 202, and the stock of similarity classes is used further refine the fragmentation of the frames of acoustic data into segments. Also, the stock of similarity classes can be used to ref ine the manner in which the segments are matched with each other. For instance, smaller subdivisions of segments that belong to each similarity class can be compared with each other and matched among themselves within each set of similarity classes. Also, PCM data can be produced in step 201 for smaller intervals d for sampling the audio data, and refined acoustic strings fragmented in step 202 can be matched based on acoustic strings and clusters which have already been matched in a previous iteration of the routine. If the clustering has been adequately refined (step 206), all of the similarity classes obtained in step 205 are collected and stored in a corpus (step 208). Furthermore, the similarity classes are stored in the corpus in an order that corresponds the order of their context in the acoustic data from which they were produced.

The ordered similarity classes form strings of clusters (e.g. strings of words in a corpus of words) and are aligned with the acoustic data with respect to time. Since a set of all of the different similarity classes is stored in the stock of similarity classes in step 207, a vocabulary of symbols (i.e. clusters) is obtained in step 207, and textual data for different levels is composed from these symbols in the corpus generated in step 208. Also, the symbols are marked with their respective lengths in order to preserve information reflecting their dominance and the hierarchy of the clusters (i.e. similarity classes). For example, the symbols may be marked (C1, C2, C3 . . . ) for the level 1 lengths and may be marked (CC1, CC2, . . . ) for level 2 lengths in the corpus of similarity classes formed in step 208.

Figures 3A, 3B:
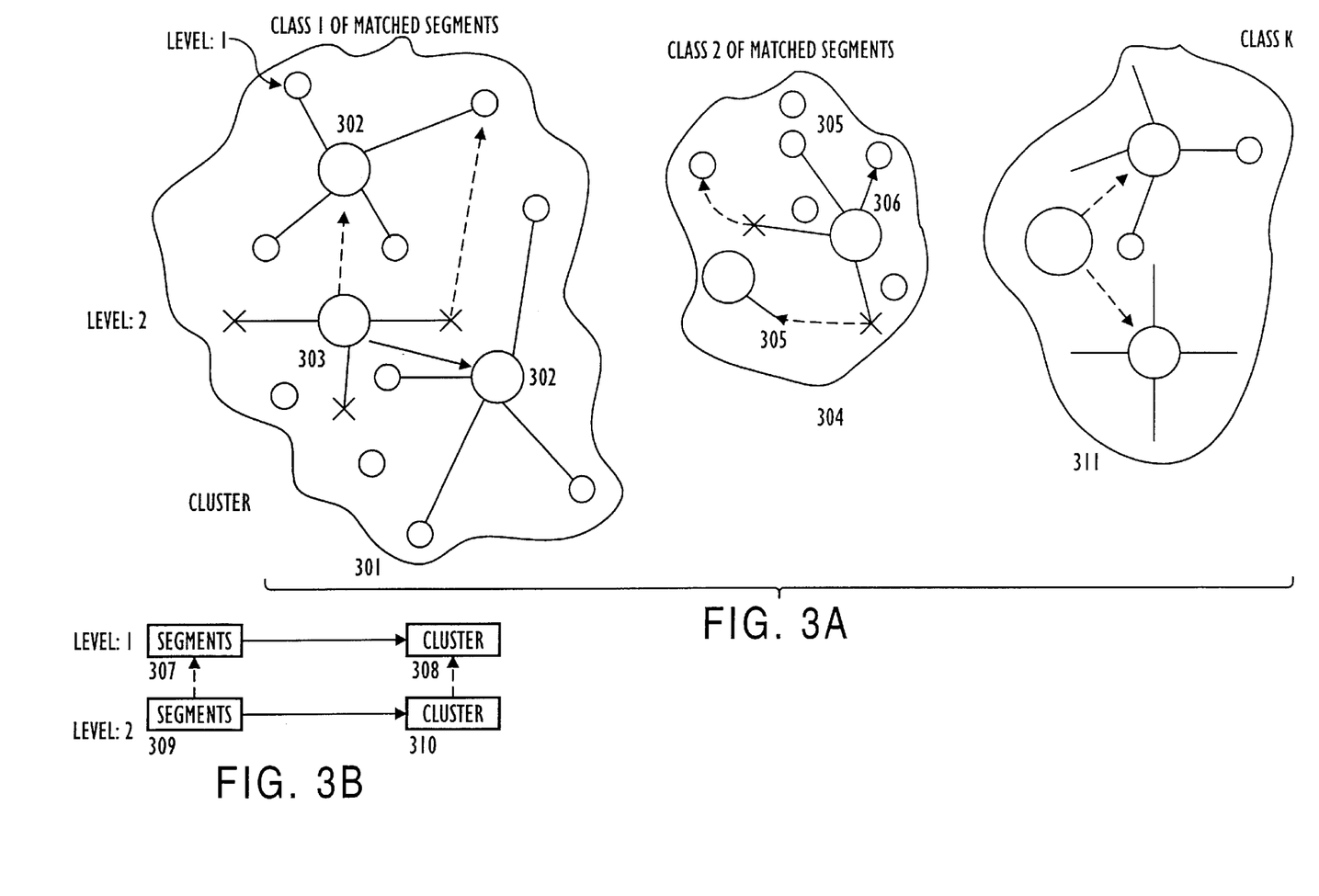
FIG. 3A illustrates various clusters of matched segments.
FIG. 3B illustrates the relative domination of segments and clusters.

FIG. 3a illustrates an example of how segments are clustered in the clustering procedure used in steps 105 and 205. Specifically, the different sets of matched segments are represented in FIG. 3a by 301, 304, and 311 as classes 1, 2, . . . k). Each class 1, 2 . . . k consists of a set of vectors denoted by points and small crosses into which strings of matched segments have been mapped using some metric. Crosses represent segments having level 2 lengths that dominate segments which have level 1 lengths and which are represented by points. This domination of the level 2 segments is schematically represented in FIG. 3a by dotted arrows. The vectors are clustered into classes which are represented by small circles 302 in the first class 301 and by small circles 305 in the second class 304. Other clusters are represented by larger circles 303 in the first class 301 and by larger circles 306 in the second class 304 and were clustered from vectors represented by crosses that dominate the vectors represented by dots. As a result, the hierarchy of the domination of segments induces a hierarchy of the domination of clusters. The relative domination of segments and clusters is schematically shown in FIG. 3b in which the hierarchy of the domination of segments 307 and 309 induces a hierarchy of the domination of the clusters 308 and 310. The technique for performing the above procedures to produce clusters can include K-means or other known methods. Examples of such techniques can be found in Jerome R. Bellegarda, *Context-Dependent Vector Clustering for Speech Recognition*, Automatic Speech and Speaker Recognition (Advanced Topics), Kluwer Academic Publisher, pp. 133–157 (Boston 1996) (edited by Chin-hui Lee, Frank K. Soong, Kuldip K. Paliwal). Such reference is incorporated herein by reference.

A more detailed description of how the procedure in step 108 of FIG. 1 is performed will be described below. In step 108, the probabilities of the segments and subsegments stored in the corpus formed in step 208 are calculated, and the probabilities of the n-gram statistics for the segments and subsegments are calculated. The manner in which the probabilities of the n-gram statistics are generated is similar to the manner in which probabilities for n-gram statistics are generated from usual textual corpuses to train a language model. (A language model is synonymous with the n-gram statistics for words). A more detailed discussion of language models can be found in the reference Lalit R. Bahl, et al., *A Maximum Likelihood Approach to Continuous Speech Recognition*, IEEE Transactions on Pattern Analysis and Machine Intelligence, vol. PAMI-5, No. 2 (March 1983) which was mentioned above. Such reference is incorporated herein by reference.

Before describing a specific embodiment of the procedure used in step 108, some elementary concepts will first be described. N-gram statistics contain counts for all n-tuples (n=1, 2, 3, . . .) of different symbols from the stock of similarity classes obtained in step 207. An "In-tuple" is a set of symbols which contains "n" symbols. For example, a 1-tuple may contain the symbol S1, a 2-tuple may contain the symbols S1 and S2, and a 3-tuple may contain the symbols S1, S2, and S3. For example, the sentence "A dog ate my homework" can be considered to be a set of symbols (i.e. words). The 1-tuples of words contained in the sentence are: {A}, {dog}, {ate}, {my}, and {homework}. Some of the 2-tuples of words contained in the sentence comprise: {A dog}, {dog ate}, {ate my}, and {my homework}. Some of the 3-tuples of words contained in the sentence include: {A dog ate}, {dog ate my}, and {ate my homework}. These statistics are collected separately for symbols corresponding to different levels, and the counts are used to estimate the probabilities that various strings contain certain symbols for the different levels.

If the symbols of the n-tuples correspond to words, the probabilities correspond to word probability distributions which are probability measures on a space of words. Thus, in order to calculate the word probability distribution, the number of times that a particular n-tuple is contained in a corpus of symbols (e.g. words) is compared with the number of times that one or more of the words in the n-tuple is contained in the corpus of words. For example, assume that a 2-tuple contains a certain pair of words W1, W2, that the pair of words W1, W2 is contained in the corpus of words 10,000 times, and that the single word W2 is contained in the corpus 20,000 times. Then, the aprobability that the word W1 will occur when the word W2 occurs (i.e $P(W1|W2)$) equals 10,000/20,000=1/2. Similarly, if the word W2 is designated to be a particular word and the variable X equals all possible words W1, W2, W3, W4, etc. contained in the corpus, a word probability distribution $P(X|W2)$ can be calculated.

Similarly, if the symbols in the n-tuple correspond to similarity classes (i.e. similarity clusters), the probabilities correspond to cluster probability distributions which are measures on a space of similarity classes. Thus, if the variable X equals all possible similarity classes C1, C2, C3, etc. in a corpus, a cluster probability distribution $P(X|Ck)$ for a particular similarity class Ck can be calculated.

Figure 6:
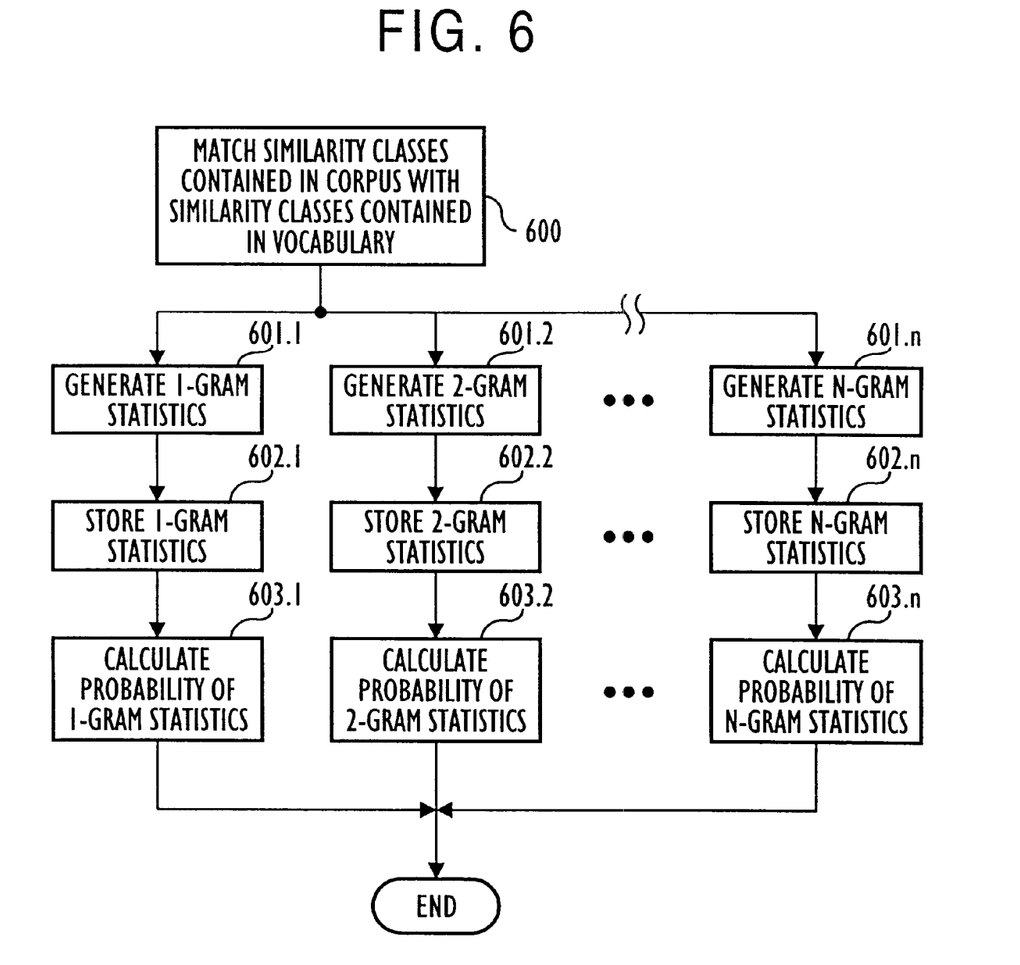
FIG. 6 illustrates a flow chart for calculating probabilities of n-gram statistics.

FIG. 6 illustrates an example of a method in step 108 for calculating the n-gram statistics for the similarity classes of segments and subsegments and for calculating the probabilities of the n-gram statistics for the similarity classes. First, the similarity classes contained in the corpus formed in step 107 are matched with the similarity classes contained in the vocabulary formed in step 106 in order to identify the classes in the corpus which are contained in the vocabulary (step 600). Also, classes which are contained in the corpus that are not contained in the vocabulary are identified with an "unknown" class symbol $C_u$. Then, a counter generates a 1-gram statistic (i.e. 1-gram count) $N_{C_x}$ for each class $C_x$ in the corpus and generates a 2-gram count $N_{C_xC_y}$ for each pair of classes $C_x$ and $C_y$ in the corpus. Such process is continued until the n-gram counts $N_{C_x \ldots C_n}$ for the classes $C_x$ to $C_n$ in the corpus have been generated (steps 601.1, 601.2, ..., 601.n). Then, the 1-gram counts $N_{C_x}$, 2-gram counts $N_{C_xC_y}$, ..., and n-gram counts $C_{C_x \ldots C_n}$ are stored (steps 602.1, 602.2, ..., and 602.n). The probability $P(C_x)$ of the 1-gram statistic $N_{C_x}$ for each class $C_x$ is computed by dividing the statistic $N_{C_x}$ by the total number of counts $N_{TOT}$ of all of the classes (step 603.1). The probabilities of the 2-gram statistics through the n-gram statistics are calculated in a similar manner (steps 603.2 to 603.n).

After the various probabilities in step 108 are calculated, the frequencies of the segments and n-gram segment statistics are matched with known frequencies and n-gram statistics in step 109. Then, in step 110, the best match of segments (and/or subsegments) to words (and/or subwords) that provides the best match of n-gram segment statistics and n-gram statistics for letters, combinations of letters, and words is determined. An example of how the best match is determined is described below in conjunction with FIG. 4.

Figure 4:
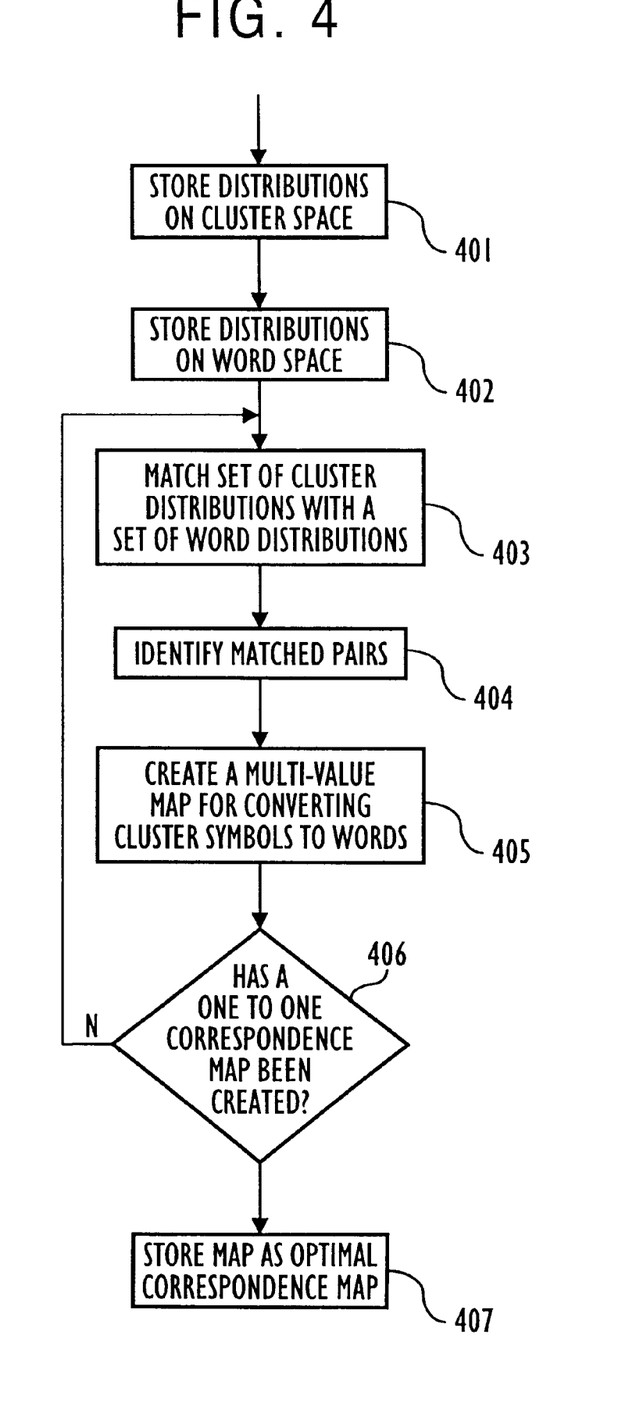
FIG. 4 illustrates a flow chart for matching similarity classes to words.

First, various cluster probability distributions are stored (step 401), and various word probability distributions are stored (step 402). Then, a set of cluster probability distributions is matched with a set of word probability distributions using some distance metric (e.g. Kulback distance) (step 403). Pairs of cluster and word probability distributions that have small distances between each other are identified as matched pairs (step 404), and the matched pairs are used to build a multi-value map which is used to convert symbols in the similarity classes to words (step 405). This multi-value map may relate symbols to several words. For example, matching frequencies of symbols and words allows some symbols S={C1, C2, C3, ..} to be matched with some words T={W1, W2, W3, ... } with some possible collisions. (A "collision" defines the situation in which several different similarity classes are mapped to the same word). This map is used to match further distributions in step 403 to produce a refined map for converting symbols of the similarity classes into words with a fewer number of collisions. For example, the matched symbols and words from the groups S and T can be used to match distributions of symbols and words that already correspond to the matched symbols and words from the groups S and T. This extended set of the pair of matched distributions allows more symbols to be matched with more words to further reduce the number of collisions. The above procedure is repeated until the number of collisions is reduced to a minimum and a one-to-one correspondence map of symbols into words is constructed (step 406). Then, the map is stored as an optimal correspondence map (step 407). Additional descriptions of various techniques for encoding symbols into words using known distributions can be found in Deavors, C. A. ans Kruh, L. "*Machine Cryptography and Modern Cryptoanalysis*", (Dedham, Mass.: Artech House 1985). Such reference is incorporated herein by reference.

Figure 5:
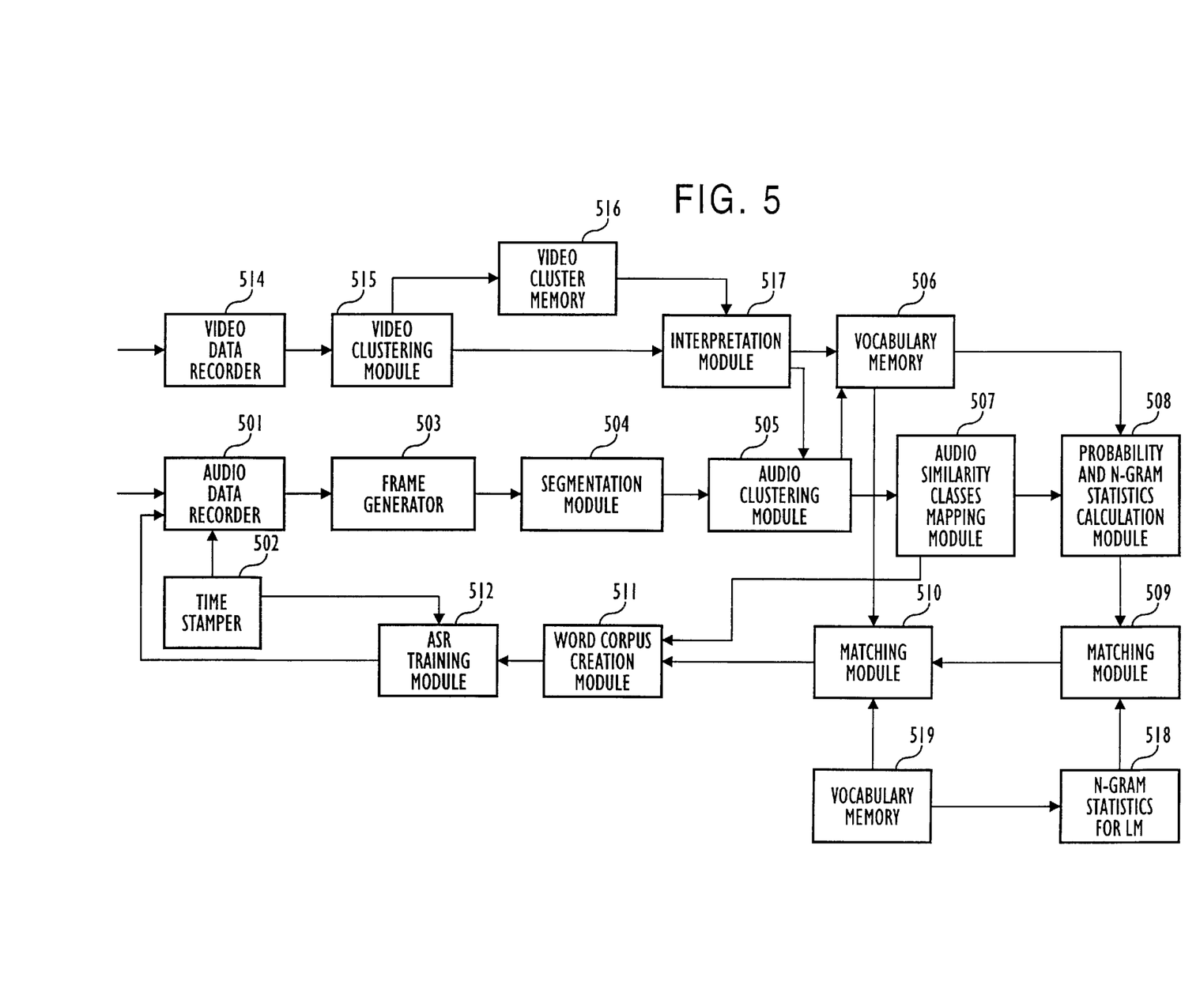
FIG. 5 illustrates an example of an apparatus for a new training system.

An illustrative embodiment of an apparatus which uses the method shown in FIGS. 1 and 1A to train an ASR is shown in FIG. 5. As illustrated in FIG. 5, the apparatus includes an audio data recorder 501, a time stamper 502, a frame generator 503, a segmentation module 504, an audio clustering module 505, a first vocabulary memory 506, an audio similarity classes mapping module 507, a probability and n-gram statistics calculation module 508, first and second matching modules 509 and 510, a word corpus creation module 511, an ASR training module 512, a language model n-gram statistic module 518, and a second vocabulary memory 519.

The audio data recorder 501 inputs and records audio data, and the time stamper 502 stamps the data with a time identifying when it was recorded. The frame generator 503 samples signals of the recorded audio data and converts the sampled signals into a string of frames via a PCM operation and a Fourier transform operation, and the string of frames is stored. The segmentation module 504 inputs the string of frames and segments the strings to produce segments.

Then, the audio clustering module 505 compares the segments with each other, and similar segments are clustered together to form audio similarity classes. The similarity classes are output to the vocabulary memory 506 and the audio similarity classes mapping module 507. The memory 506 inputs and stores each of the different similarity classes to form a vocabulary of audio similarity classes, and the mapping module 507 labels the similarity classes with the similarity classes stored in the memory 506 and stores them in a corpus.

The probability and n-gram statistics calculation module 508 inputs the corpus of audio similarity classes from the mapping module 507 and inputs the similarity classes from the memory 506. Then, the module 508 calculates the probabilities of the segments and subsegments contained in the similarity classes and calculates the probabilities of the n-gram statistics for the segments and subsegments contained in the similarity classes.

The first matching module 509 inputs the frequencies of the segments and the n-gram segment statistics from the calculation module 508 and inputs known frequencies and n-gram statistics for letters, combinations of letters, and words from the n-gram statistic module 518. Then, the frequencies and n-gram statistics from the calculation module 508 are matched with the known frequencies and n-gram statistics from the module 518.

The second matching module 510 inputs the similarity classes from the first vocabulary memory 506, inputs word data from the second vocabulary memory 519, and inputs the results of the matching operation performed by the first matching module 509. Then, the matching module 510 determines the best match of segments (and/or subsegments) to words (and/or subwords) which provides the best match of n-gram segment statistics to n-gram statistics for letters, combinations of letters, and words.

The word corpus creation module 511 inputs the word or words from the matching module 510 that constitute the best match and inputs the corpus of audio similarity classes formed by the mapping module 507. Then, the creation module 511 creates a corpus of words by comparing the word or words with the corpus of audio similarity classes. The ASR training module 512 inputs the words from corpus of words which are aligned with the time stamped value of the acoustic data that was recorded by the recorder 501 and performs a training operation based on such words. Then, the training module 512 determines if the ASR has been adequately trained to recognize words with a particular accuracy. If the ASR has not been adequately trained, the results of the training operation are input to the audio data recorder 501 and the above operation is repeated until the ASR is adequately trained.

The apparatus may additionally comprise a video data recorder 514, a video clustering module 515, a video cluster memory 516, and an interpretation module 517 to improve the accuracy of the ASR. The video data recorder 514 inputs and records video data. Then, the video clustering module 515 inputs portions of the video data, compares the portions with each other, and clusters similar portions together to form video similarity classes.

The video similarity classes are input by the video cluster memory 516 and the interpretation module 517. The memory 516 stores the similarity classes as a stock of video similarity classes, and the interpretation module 517 interprets the clusters of video data and matches them with possible audio data. Then, the possible audio data is output to the audio clustering module 505 and the vocabulary memory 506. The clustering module 505 uses the possible audio data to cluster more accurately the segments of audio data output from the segmentation module 504.

One of ordinary skill in the art will readily realize that many of the modules and components described above can be embodied in software or hardware.

Also, the embodiments described above are merely illustrative, and modifications of such embodiments may occur to those skilled in the art. Accordingly, this invention is not to be regarded as limited to the embodiments disclosed herein, but is to be limited only as defined by the appended claims.

What is claimed:

1. A method for training an automatic speech recognizer, comprising the steps of:
   (a) inputting audio data;
   (b) segmenting said audio data to produce audio segments of said audio data;
   (c) clustering said audio segments into groups of clustered audio segments, wherein said clustered audio segments in each of said groups have similar characteristics and wherein said groups respectively form audio similarity classes;
   (d) calculating audio segment probability distributions for said clustered audio segments in said audio similarity classes;
   (e) determining audio segment frequencies for said clustered audio segments in said audio similarity classes based on said audio segment probability distributions;
   (f) matching said audio segment frequencies to known audio segment frequencies for at least one of letters, combination of letters, and words to determine frequency matches;
   (g) forming a textual corpus of words based on said frequency matches; and
   (h) training acoustic models of said automatic speech recognizer based on said textual corpus.

2. The method according to claim 1, further comprising the step of:
   (i) repeating said steps (a) through (h) until said automatic speech recognizer is adequately trained.

3. The method according to claim 1, wherein said step (a) comprises the steps of:
   (a1) storing said audio data; and
   (a2) time stamping said audio data when said audio data is stored.

4. The method according to claim 1, wherein said step (b) comprises the steps of:
   (b1) sampling said audio data to produce sampled audio data;
   (b2) converting said sampled audio data into a string of frames of audio data;
   (b3) segmenting said string of frames of audio data to produce said audio segments.

5. The method according to claim 4, wherein said audio segments have different lengths which are based on average lengths of words, subwords, and phonemes and which are based on probability distributions of said words, subwords, and phonemes.

6. The method according to claim 1, wherein said step (c) comprises the steps of:
   (c1) matching said audio segments with each other using similarity criteria of said audio segments to produce matched audio segments;
   (c2) arranging said matched audio segments in a hierarchical order based on a size of said matched audio segments; and
   (c3) clustering said matched audio segments to form said clustered audio segments to produce said audio similarity classes.

7. The method according to claim 6, wherein said step (c) further comprises the steps of:
   (c4) determining if said audio similarity classes produced in said step (c3) are refined above a predetermined level of refinement; and
   (c5) repeating said steps (b) through (c4) in accordance with said audio similarity classes until said audio similarity classes are refined above said predetermined level of refinement.

8. The method according to claim 1, wherein said step (d) further comprises the steps of:
   (d1) forming an audio segment corpus of said clustered audio segments such that said clustered audio segments are ordered in said audio segment corpus in accordance with an order in which said audio data is input in said step (a); and
   (d2) calculating said audio segment probability distributions of each of said clustered audio segments in said audio segment corpus based on a number of instances that each of said clustered audio segments is contained in said audio segment corpus and based on a total number of said clustered audio segments.

9. The method as claimed in claim 8, wherein said step (d) further comprises the steps of:
   (d3) determining n-gram statistics for each of said clustered audio segments in said audio segment corpus, wherein said n-gram statistics are based on a number of instances that a particular one of said clustered audio segments is contained in said audio segment corpus and are based on a number of instances that said particular one of said clustered audio segments is associated with at least another clustered audio segment in said audio segment corpus.

10. The method as claimed in claim 9, wherein said step (d) further comprises the step of:
    (d4) calculating n-gram probability distributions of said n-gram statistics.

11. The method as claimed in claim 9, wherein said step (e) comprises the steps of:
    (e1) determining n-gram segment statistic frequencies for said clustered audio segments based on said n-gram statistics for the clustered audio segments; and (e2) determining said audio segment frequencies for said clustered audio segments based on said audio segment probability distributions.

12. The method as claimed in claim 11, wherein said step (f) comprises the steps of:
    (f1) matching said audio segment frequencies to said known audio segment frequencies; and
    (f2) matching said n-gram segment statistic frequencies to known n-gram statistic frequencies for said at least one of letters, combination of letters, and words.

13. The method as claimed in claim 12, wherein said step (f) further comprises the steps of:
    (f3) determining a best n-gram match of said n-gram segment statistic frequencies to said known n-gram statistic frequencies; and
    (f4) determining a best segment match of said audio segment frequencies to said known audio segment frequencies based on said best n-gram match, wherein said best n-gram match and said best segment match at least partially constitute said frequency matches.

14. The method as claimed in claim 13, wherein said step (g) comprises the steps of:
    (g1) comparing said audio segments corresponding to said audio segment frequencies of said best segment match with said audio similarity classes formed in said step (c);
    (g2) determining which of said audio segments constitute matching audio segments that match said audio similarity classes; and
    (g3) forming said textual corpus by using said matching audio segments, wherein said textual corpus maps certain audio similarity classes to certain audio segments.

15. The method as claimed in claim 14, wherein said audio segments comprise one of words and subwords.

16. The method as claimed in claim 14, wherein said audio segments comprise words and subwords.

17. The method as claimed in claim 1, further comprising the steps of:
    (i) inputting video data;
    (j) clustering video portions of said video data into video groups of clustered video portions, wherein said clustered video portions in each of said of video groups have similar video characteristics and wherein said video groups respectively form video similarity classes;
    (k) interpreting said clustered video data and matching said clustered video data to possible audio data;
    (l) using said possible audio data in said step (c) to more accurately cluster said audio segments into said groups of said clustered audio segments.

18. The method as claimed in claim 17, wherein said step (i) further comprises the steps of:
    (i1) storing said video data; and
    (i2) time stamping said video data when said video data is stored.

19. The method as claimed in claim 17, wherein said step (k) further comprises the steps of:
    (k1) automatically interpreting and matching said video data based on a video map which maps video data to said possible audio data.

20. The method as claimed in claim 1, further comprising the steps of:
    (i) inputting biometric data;
    (j) clustering biometric portions of said biometric data into biometric groups of clustered biometric portions, wherein said clustered biometric portions in each of said of biometric groups have similar biometric characteristics and wherein said biometric groups respectively form biometric similarity classes;
    (k) interpreting said clustered biometric data and matching said clustered biometric data to possible audio data;
    (l) using said possible audio data in said step (c) to more accurately cluster said audio segments into said groups of said clustered audio segments.

21. The method as claimed in claim 20, wherein said step (i) further comprises the steps of:
    (i1) storing said biometric data; and
    (i2) time stamping said biometric data when said biometric data is stored.

22. The method as claimed in claim 20, wherein said step (k) further comprises the steps of:
    (k1) automatically interpreting and matching said biometric data based on a biometric map which maps biometric data to said possible audio data.

23. A method for training an automatic speech recognizer, comprising the steps of:
    (a) storing audio data and time stamping said audio data when said audio data is stored;
    (b) sampling said audio data to produce sampled audio data and converting said sampled audio data into a string of frames of audio data;
    (c) segmenting said string of frames to produce audio segments;
    (d) comparing said audio segments with each other to determine audio similarities among said audio segments and clustering said audio segments into groups of clustered audio segments based on said similarities, wherein said groups respectively form audio similarity classes;
    (e) storing at least some of said audio similarity classes in a vocabulary of comprehensive audio similarity classes;
    (f) forming an audio segment corpus of said clustered audio segments in said audio similarity classes, wherein said clustered audio segments are ordered in said audio segment corpus in accordance with an order in which said audio data is stored in said step (a);
    (g) calculating audio segment probability distributions for said clustered audio segments in said audio segment corpus;
    (h) determining audio segment frequencies for said clustered audio segments in said audio segment corpus based on said audio segment probability distributions;
    (i) matching said audio segment frequencies to known audio segment frequencies for at least one of letters, combination of letters, and words to determine frequency matches;
    (j) forming a textual corpus of words based on said frequency matches; and
    (k) training acoustic models of said automatic speech recognizer based on said textual corpus.

24. The method according to claim 23, further comprising the step of:
    (l) repeating said steps (a) through (k) until said automatic speech recognizer is adequately trained.

25. The method according to claim 23, wherein said audio segments have different lengths which are based on average lengths of words, subwords, and phonemes and which are based on probability distributions of said words, subwords, and phonemes.

26. The method according to claim 23, wherein said step (d) comprises the steps of:
   (d1) determining if said audio similarity classes are refined above a predetermined level of refinement; and
   (d1) repeating said steps (c) to (d1) in accordance with said audio similarity classes until said audio similarity classes are refined above said predetermined level of refinement.

27. The method according to claim 23, wherein said step (g) comprises the steps of:
   (g1) calculating said audio segment probability distributions of each of said clustered audio segments in said audio segment corpus based on a number of instances that each of said clustered audio segments is contained in said audio segment corpus and based on a total number of said clustered audio segments.

28. The method as claimed in claim 27, wherein said step (g) further comprises the steps of:
   (g2) determining n-gram statistics for each of said clustered audio segments in said audio segment corpus, wherein said n-gram statistics are based on a number of instances that a particular one of said clustered audio segments is contained in said audio segment corpus and are based on a number of instances that said particular one of said clustered audio segments is associated with at least another clustered audio segment in said audio segment corpus; and
   (g3) calculating n-gram probability distributions of said n-gram statistics.

29. The method as claimed in claim 28, wherein said step (h) comprises the steps of:
   (h1) determining n-gram segment statistic frequencies for said clustered audio segments based on said n-gram statistics for the clustered audio segments; and
   (h2) determining said audio segment frequencies for said clustered audio segments based on said audio segment probability distributions.

30. The method as claimed in claim 29, wherein said step (i) comprises the steps of:
   (i1) matching said audio segment frequencies to said known audio segment frequencies;
   (i2) matching said n-gram segment statistic frequencies to known n-gram statistic frequencies for said at least one of letters, combination of letters, and words;
   (i3) determining a best n-gram match of said n-gram segment statistic frequencies to said known n-gram statistic frequencies; and
   (i4) determining a best segment match of said audio segment frequencies to said known audio segment frequencies based on said best n-gram match, wherein said best n-gram match and said best segment match at least partially constitute said frequency matches.

31. The method as claimed in claim 30, wherein said step (j) comprises the steps of:
   (j1) comparing said audio segments corresponding to said audio segment frequencies of said best segment match with said audio similarity classes formed in said step (d);
   (j2) determining which of said audio segments constitute matching audio segments that match said audio similarity classes; and
   (j3) forming said textual corpus by using said matching audio segments, wherein said textual corpus maps certain audio similarity classes to certain audio segments.

32. An apparatus for training an automatic speech recognizer, comprising:
   a receiver which inputs audio data;
   a segmenting device which is coupled to said receiver and which segments said audio data to produce audio segments of said audio data;
   an audio clustering device which is coupled to said segmenting device and which clusters said audio segments into groups of clustered audio segments, wherein said clustered audio segments in each of said groups have similar characteristics and wherein said groups respectively form audio similarity classes;
   a probability calculating device which is coupled to said audio clustering device and which calculates audio segment probability distributions for said clustered audio segments in said audio similarity classes;
   a frequency determining device which is coupled to said probability calculating device and which determines audio segment frequencies for said clustered audio segments in said audio similarity classes based on said audio segment probability distributions;
   a frequency comparator which is coupled to said frequency determining device and which matches said audio segment frequencies to known audio segment frequencies for at least one of letters, combination of letters, and words to determine frequency matches;
   a textual corpus generator which is coupled to said frequency comparator and which generates a textual corpus of words based on said frequency matches; and
   an acoustic model trainer which is coupled to said textual corpus generator and which trains acoustic models of said automatic speech recognizer based on said textual corpus.

33. The apparatus according to claim 32, wherein said receiver comprises:
   a memory which stores said audio data; and
   a time stamper which time stamps said audio data when said audio data is stored in said memory.

34. The apparatus according to claim 32, wherein said segmenting device comprises:
   a sampling device which samples said audio data to produce sampled audio data;
   a converter which is coupled to said sampling device and which converts said sampled audio data into a string of frames of audio data;
   a string segmenter which is coupled to said converter and which segments said string of frames of audio data to produce said audio segments.

35. The apparatus according to claim 34, wherein said audio segments have different lengths which are based on average lengths of words, subwords, and phonemes and which are based on probability distributions of said words, subwords, and phonemes.

36. The apparatus according to claim 32, wherein said audio clustering device comprises:
   a segment comparator which matches said audio segments with each other using similarity criteria of said audio segments to produce matched audio segments;
   an arranging device which is coupled to said segment comparator and which arranges said matched audio segments in a hierarchical order based on a size of said matched audio segments; and
   a matched segment clusteror which is coupled to said arranging device and which clusters said matched audio segments to form said clustered audio segments to produce said audio similarity classes.

37. The apparatus according to claim 32, wherein said probability calculating device further comprises:

an audio segment corpus generator which generates an audio segment corpus of said clustered audio segments such that said clustered audio segments are ordered in said audio segment corpus in accordance with an order in which said audio data is input by said receiver; and a distribution calculator which is coupled to said audio segment corpus generator and which calculates said audio segment probability distributions of each of said clustered audio segments in said audio segment corpus based on a number of instances that each of said clustered audio segments is contained in said audio segment corpus and based on a total number of said clustered audio segments.

38. The apparatus as claimed in claim 37, wherein said probability calculating device further comprises:

an n-gram statistic determiner which determines n-gram statistics for each of said clustered audio segments in said audio segment corpus, wherein said n-gram statistics are based on a number of instances that a particular one of said clustered audio segments is contained in said audio segment corpus and are based on a number of instances that said particular one of said clustered audio segments is associated with at least another clustered audio segment in said audio segment corpus; and an n-gram probability distribution calculator which is coupled to said n-gram statistic determiner and which calculates n-gram probability distributions of said n-gram statistics.

39. The apparatus as claimed in claim 38, wherein said frequency determining device comprises:

an n-gram segment statistic frequency determiner which determines n-gram segment statistic frequencies for said clustered audio segments based on said n-gram statistics for the clustered audio segments; and an audio segment frequency determiner which is coupled to said n-gram segment statistic frequency determiner and which determines said audio segment frequencies for said clustered audio segments based on said audio segment probability distributions.

40. The apparatus as claimed in claim 39, wherein said frequency comparator comprises:

an audio segment comparator which matches said audio segment frequencies to said known audio segment frequencies;

an n-gram segment comparator which matches said n-gram segment statistic frequencies to known n-gram statistic frequencies for said at least one of letters, combination of letters, and words;

a best n-gram match determiner which determines a best n-gram match of said n-gram segment statistic frequencies to said known n-gram statistic frequencies; and a best segment match determiner which determines a best segment match of said audio segment frequencies to said known audio segment frequencies based on said best n-gram match, wherein said best n-gram match and said best segment match at least partially constitute said frequency matches.

41. The apparatus as claimed in claim 40, wherein said textual corpus generator comprises:

textual corpus comparator which compares said audio segments corresponding to said audio segment frequencies of said best segment match with said audio similarity classes formed by said audio clustering device;

a textual corpus determiner which determines which of said audio segments constitute matching audio segments that match said audio similarity classes; and a textual corpus formation device which forms said textual corpus by using said matching audio segments, wherein said textual corpus maps certain audio similarity classes to certain audio segments.

42. The apparatus as claimed in claim 32, further comprising:

a video receiver which inputs video data;

a video clustering device which is coupled to said video receiver and which clusters video portions of said video data into video groups of clustered video portions, wherein said clustered video portions in each of said of video groups have similar video characteristics and wherein said video groups respectively form video similarity classes; and an interpreter which is coupled to said video clustering device and which interprets said clustered video data and matches said clustered video data to possible audio data, wherein said audio clustering device using said possible audio data generated by said interpreter to more accurately cluster said audio segments into said groups of said clustered audio segments.

43. The apparatus as claimed in claim 42, wherein said video receiver comprises:

a video memory which stores said video data input by said video receiver; and a time stamper which time stamps said video data when said video data is stored in said video memory.

44. The apparatus as claimed in claim 42, wherein said interpreter comprises:

an automatic interpreter which automatically interprets and matches said video data based on a video map which maps video data to said possible audio data.

45. The apparatus as claimed in claim 32, further comprising:

a biometric receiver which inputs biometric data;

a biometric clustering device which is coupled to said biometric receiver and which clusters biometric portions of said biometric data into biometric groups of clustered biometric portions, wherein said clustered biometric portions in each of said of biometric groups have similar biometric characteristics and wherein said biometric groups respectively form biometric similarity classes; and an interpreter which is coupled to said biometric clustering device and which interprets said clustered biometric data and matches said clustered biometric data to possible audio data, wherein said audio clustering device using said possible audio data generated by said interpreter to more accurately cluster said audio segments into said groups of said clustered audio segments.

46. The apparatus as claimed in claim 45, wherein said biometric receiver comprises:

a biometric memory which stores said biometric data input by said biometric receiver; and a time stamper which time stamps said biometric data when said biometric data is stored in said biometric memory.

47. The apparatus as claimed in claim 45, wherein said interpreter comprises:

an automatic interpreter which automatically interprets and matches said biometric data based on a biometric map which maps biometric data to said possible audio data.

* * * * *